April 21, 1925.
E. K. BAHSLER
1,534,151
AUTOMOBILE MAP HOLDER
Filed March 17, 1924      3 Sheets-Sheet 1
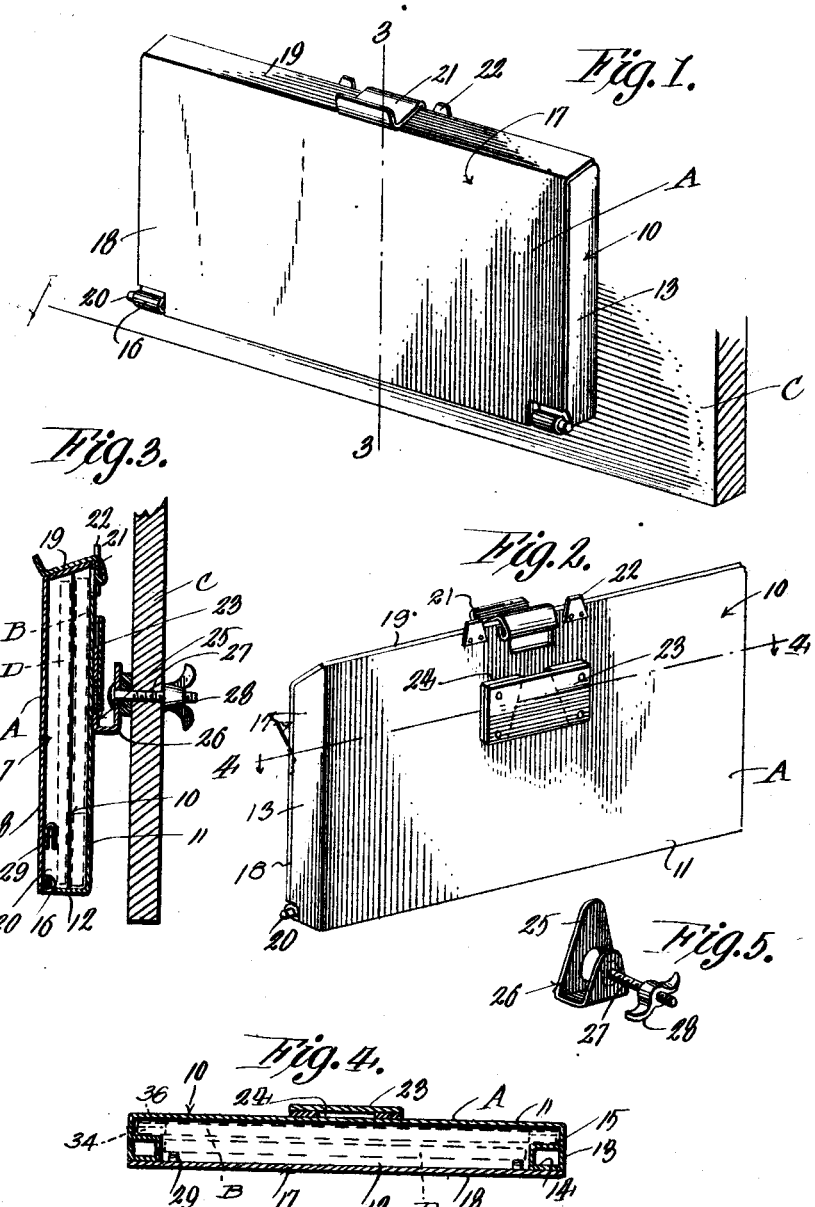
WITNESSES
Inventor
EUGENE K. BAHSLER April 21, 1925.
E. K. BAHSLER
1,534,151
AUTOMOBILE MAP HOLDER
Filed March 17, 1924     3 Sheets-Sheet 2
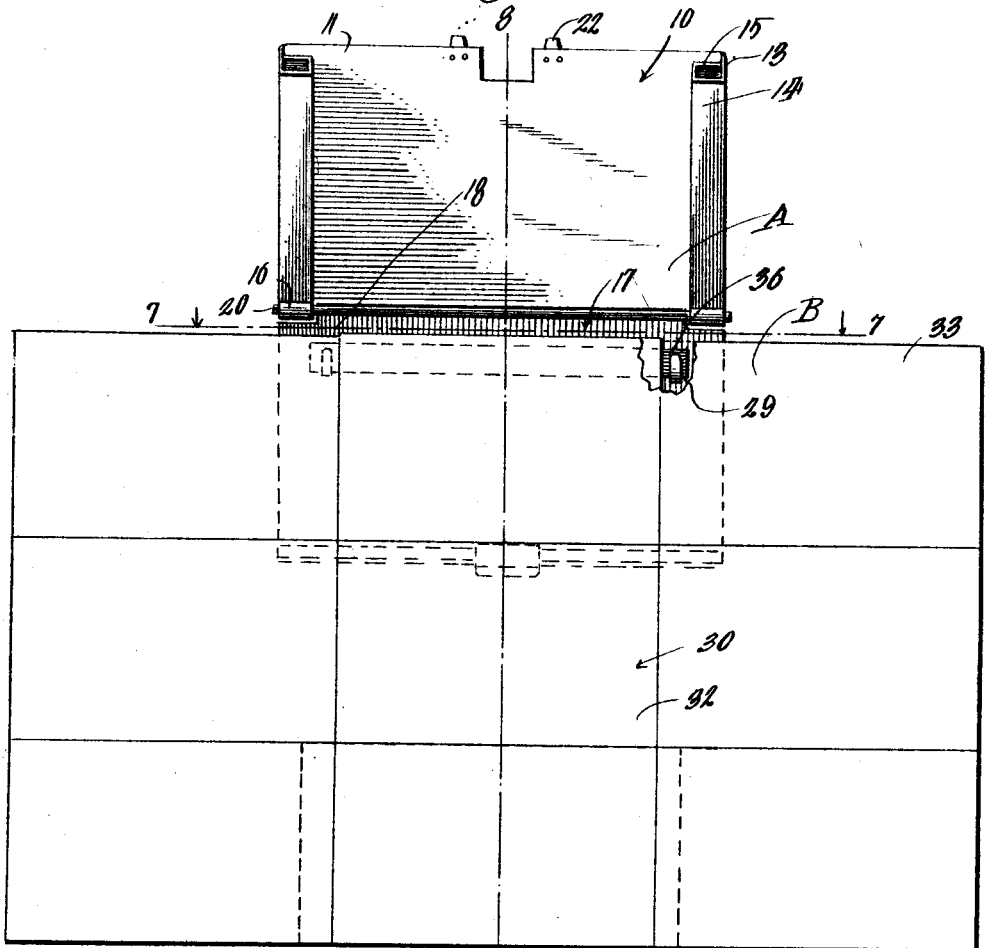
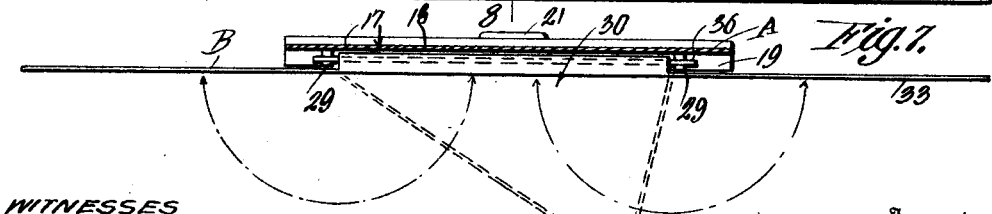

April 21, 1925.
E. K. BAHSLER
1,534,151
AUTOMOBILE MAP HOLDER
Filed March 17, 1924
3 Sheets-Sheet 3
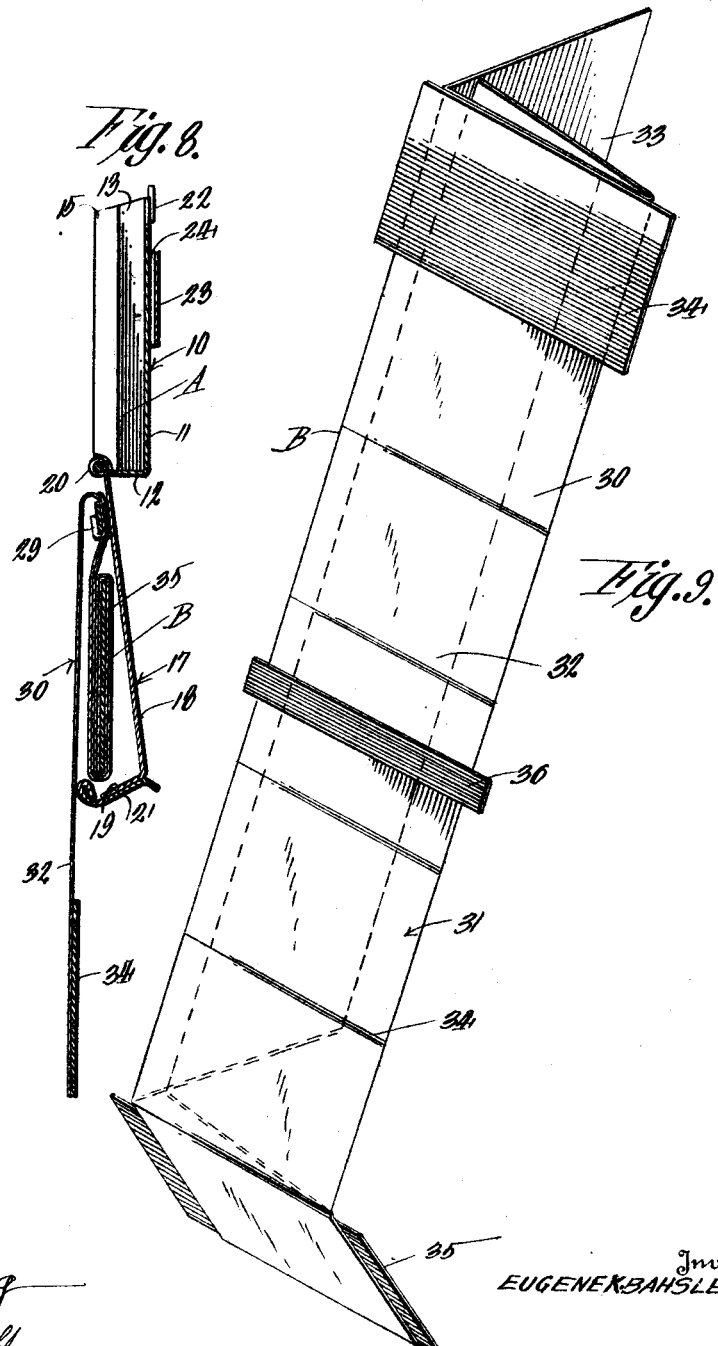
WITNESSES
Inventor
EUGENE K. BAHSLER
By Richard B. Owen
Attorney Patented Apr. 21, 1925.

1,534,151

UNITED STATES PATENT OFFICE.

EUGENE K. BAHSLER, OF TYNGSBORO, MASSACHUSETTS.

AUTOMOBILE MAP HOLDER.

Application filed March 17, 1924. Serial No. 699,936.

*To all whom it may concern:*

Be it known that I, EUGENE K. BAHSLER, a citizen of the United States, residing at Tyngsboro, in the county of Middlesex and State of Massachusetts, have invented certain new and useful Improvements in Automobile Map Holders, of which the following is a specification.

This invention relates to automobile appliances and the primary object of the invention is to provide novel means for supporting a map on the instrument board of an automobile, the support being so constructed as to form a protector for the map, when the map is not in use, and means for holding the map, so that the same can be readily viewed by the operator of the machine, when the map is in use.

Another prime object of the invention is the provision of a novel case for receiving a map and route book, and novel means for supporting the case on the instrument board of the automobile.

A further object of this invention is the provision of novel guides and supports carried by the case for receiving the map and novel means for forming the map, whereby different parts of the map can be held in an exposed position, so as to permit the same to be readily viewed.

A still further object of the invention is to provide an improved device of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is a perspective view of the improved road map holder and case, showing the same attached to the instrument board of the automobile.

Figure 2 is a perspective view of the improved road map holder and case, showing the rear face thereof, Figure 3 is a detailed transverse sectional view taken on the line 3—3 of Figure 1, Figure 4 is a longitudinal section through the case and map holder taken on the line 4—4 of Figure 2, Figure 5 is a perspective view of the bracket, which is adapted to be associated with the instrument board for supporting the case, Figure 6 is a side elevation of the case and road map showing the case in its open position and illustrating the position of the map for permitting the lower half of the map to be readily viewed, Figure 7 is a detailed section taken on the line 7—7 of Figure 6, Figure 8 is a vertical section taken on the line 8—8 of Figure 6, and Figure 9 is a detailed perspective view of the road map illustrating the novel means for holding and supporting the same.

Referring to the drawings in detail, wherein similar reference characters designate corresponding parts throughout the several views, the letter A generally indicates the improved road map holder and case and B the road map. The improved road map holder and case A is preferably formed from sheet metal of the desired gauge and comprises a body portion 10 which is preferably formed of a single sheet of sheet metal. The body portion 10 includes the rear wall 11, the forwardly extending bottom wall 12, and the forwardly extending side walls 13. These side walls 13 are preferably provided with inwardly extending flanges 14 which are in turn provided with L-shaped extensions 15 which engage the side walls 13. The flanges 14 and the L-shaped extensions 15 form guides at each end of the body. The bottom wall 12 at the terminals thereof is provided with rolled hinge barrels 16.

The front of the body 10 is provided with a cover 17 which includes the front wall 18 and a top inclined wall 19. The lower edge of the front wall 18 is provided with companion hinged barrels for the barrels 16 and the companion hinged barrels receive hinge pins or pintles.

The cover 17 is normally maintained in its closed position by a resilient catch 21 which is carried by the top wall 19 and this catch is adapted to engage the rear wall 11 of the body A. Upstanding stops 22 are carried by the rear wall 11 and these stops form means in connection with the side walls of the body; for limiting the swinging movement of the cover 17.

The improved case and road map holder A is adapted to be detachably associated with the instrument board of an automobile, and this instrument board is indicated by the reference character C in the drawings, and in order to permit the detachable association of the case with the instrument board C, the rear face of the case is provided with a guide bracket 23 having a tapered way 24 therethrough. This way 24 is adapted to detachably receive the triangular shaped tongue 25 of the supporting bracket 26. This supporting bracket 26 is held on the instrument board C by the use of a suitable bolt 27 and wing nut 28. It is obvious that the case can be readily lifted off of the supporting bracket 26 when so desired.

The road map B is adapted to be placed in the case in the rear of the L-shaped extensions 15 and a route book D can be placed in the case in front of the map and between the L-shaped extensions.

The cover 17 carries hooks 29 for supporting the map B when the map is in use and these hooks 29 are arranged on the inside of the cover 17 and when the cover is in its closed position, these hooks engage the route book as clearly shown in Figures 3 and 4 of the drawings for substantially holding the route book in position in the case. These hooks 29 are arranged adjacent to the marginal edges of the cover on the inner face thereof as can be clearly seen by referring to the drawings.

The road map B is preferably of a large size, so that the person driving the automobile can readily observe the same and in order to permit the observing of the map at different times, the map is preferably divided into an upper section 30 and a lower section 31. Each of these sections 30 and 31 includes a central body portion 32 and folding side wings 33. The sections 30 and 31 are connected together at the body portions 32. When the map is not in use the wings 33 are folded over the body portion 32 and then the body portions are folded on the transverse lines 34.

In order to reinforce and to permit the supporting of the map the upper and lower ends of the map are provided with reinforcing plates 34 and 35 and the intermediate portion of the map is provided with a reinforcing and supporting strip 36. It is to be noted that the plates 34 and 35 and the supporting strip 36 all have their terminals extending beyond the body portion 32 of the map and the ends of the strip are adapted to fit in the rear of the L-shaped extensions 15.

When it is desired to display the whole map at one time the upper plate 34 is slipped in the case in rear of the L-shaped extensions 15 and the map is unfolded and left to depend from the case.

However, in case it is desired to view only the lower half of the map, the upper half is folded and placed within the cover 17 as clearly shown in Figure 8 of the drawings, while the terminals of the strip 36 are placed in the supporting hooks 29 and the lower portion of the map is left depending from the hooks. The lower plate 35 acts as a weight so as to hold the map in its depending position from the hooks.

When the map is in this position it is obvious that the same can be readily seen.

From the foregoing description, it can be readily seen that I have provided an improved map case and holder therefor, which will keep the map in a good condition and permit various parts thereof to be readily viewed when so desired.

Changes in details may be made without departing from the spirit or the scope of this invention, but:

What I claim as new is:

1. A combined road map case and holder comprising a sheet metal body including a rear wall, a forwardly extending bottom wall, forwardly extending side walls, guides formed on the side walls, dividing the body into a map receiving compartment and a road book receiving compartment, a hinged cover carried by the bottom wall adapted to swing in parallel relation to the body for supporting a map when the same is to be viewed, a resilient catch carried by the upper edge of the cover to engage with the body, and means for detachably connecting the case with the instrument board of an automobile.

2. The combination with a road map holder and case comprising a body, guides carried by the side walls of the body, a cover hingedly connected to the lower end of the body, of a map including a body portion and folding side wings, supporting strips connected to the body portion and arranged to extend beyond the side edges thereof, the strips being adapted to engage the guides of the body when the map is in its folded condition and when the map is in its entirely open condition, hooks carried by the inner surface of the cover for receiving one of the intermediate supporting strips connected with the map for supporting the map when the same is in its partially folded position.

3. The combination with a combined road map case and holder comprising a body portion including a rear wall, a forwardly extending bottom wall and forwardly extending side walls, the side walls being bent to provide guides disposed in spaced relation to the rear wall, a cover including a front wall and an inclined top wall, means for hingedly connecting the lower edge of the front wall to the forward edge of the bottom wall, a catch carried by the top wall for frictionally engaging the rear wall, hooks carried by the inner surface of the cover and adjacent to the pivot point of the cover, of a road map including upper and lower sections each having a body portion and folding side wings, the body portions of the sections being connected together, upper and lower bracing and supporting plates carried by the map, an intermediate supporting strip carried by the map, the plates and the strips being extended beyond the side edges of the body, the uppermost strip being adapted to rest in the body in rear of the guides when the map is in its entirely unfolded position, the intermediate supporting strip being adapted to be received by the hooks, when the map is in its partially unfolded position, the terminals of the plates and strip being all adapted to lie in the rear of the guides when the map is in its entirely folded position.

In testimony whereof I affix my signature in presence of two witnesses.

EUGENE K. BAHSLER.

Witnesses:
 FLORENCE M. MACARTNEY,
 ARTHUR BAHSLER.